(12) United States Patent
Kuzkin et al.

(10) Patent No.: US 12,206,665 B2
(45) Date of Patent: Jan. 21, 2025

(54) TECHNOLOGIES FOR SECURELY EXTENDING CLOUD SERVICE APIS IN A CLOUD SERVICE MARKETPLACE

(71) Applicant: CloudBlue LLC, Irvine, CA (US)

(72) Inventors: Maxim Kuzkin, Irvine, CA (US); Aleksandr Khaerov, Moscow (RU); Vladimir Zatsepin, Mytishchi (RU); Vladimir Grebenschikov, Moscow (RU)

(73) Assignee: CloudBlue LLC, Irvine, CA (US)

( * ) Notice: Subject to any disclaimer, the term of this patent is extended or adjusted under 35 U.S.C. 154(b) by 156 days.

(21) Appl. No.: 17/659,419

(22) Filed: Apr. 15, 2022

(65) Prior Publication Data

US 2022/0239649 A1     Jul. 28, 2022

Related U.S. Application Data

(63) Continuation of application No. 15/393,354, filed on Dec. 29, 2016, now abandoned.

(51) Int. Cl.
| | |
|---|---|
| *H04L 9/00* | (2022.01) |
| *G06F 8/36* | (2018.01) |
| *G06F 8/60* | (2018.01) |
| *H04L 9/40* | (2022.01) |
| *G06F 16/22* | (2019.01) |

(52) U.S. Cl.
CPC ............ *H04L 63/0884* (2013.01); *G06F 8/36* (2013.01); *G06F 8/60* (2013.01); *H04L 63/083* (2013.01); *H04L 63/18* (2013.01); *G06F 16/22* (2019.01); *H04L 2463/082* (2013.01)

(58) Field of Classification Search
CPC ....... H04L 63/00; H04L 63/083; H04L 63/18; H04L 2463/082; G06F 8/36; G06F 8/60; G06F 16/22
See application file for complete search history.

(56) References Cited

U.S. PATENT DOCUMENTS 9,606,794 B1* 3/2017 Chou ........................ G06F 8/71
9,716,728 B1 7/2017 Tumulak
(Continued)

OTHER PUBLICATIONS (EP178887864.1) European Patent Office, Written Opinion of the European search Report, dated. Jun. 29, 2020.

*Primary Examiner* — Kevin Ayala
(74) *Attorney, Agent, or Firm* — Ice Miller LLP

(57) ABSTRACT

Technologies for securely extending cloud service application programming interfaces (APIs) in a cloud service marketplace include a connector hub of a marketplace computing device communicatively coupled to a cloud service provider interface of a cloud service provider and a cloud service broker interface of a cloud service broker. The connector hub is configured to deploy an API connector instance in a connection factory of the marketplace computing device, transmit provider provisioning channel credentials to the API connector instance and the cloud service provider interface and transmit broker provisioning channel credentials to the API connector instance and the cloud service broker interface. The connector hub is additionally configured establish a provisioning channel between the cloud service provider interface and the cloud service broker interface. Additional embodiments are described herein.

20 Claims, 7 Drawing Sheets

(56) References Cited

U.S. PATENT DOCUMENTS

| | | |
|---|---|---|
| 2012/0005262 A1 | 1/2012 | McWhirter |
| 2012/0158821 A1 | 6/2012 | Barros |
| 2014/0059226 A1* | 2/2014 | Messerli ................. H04L 67/51 |
| | | 709/226 |
| 2014/0101434 A1* | 4/2014 | Senthurpandi ...... G06F 12/1408 |
| | | 713/150 |
| 2014/0280948 A1 | 9/2014 | Schmidt |
| 2015/0074743 A1* | 3/2015 | Ilieva .................... H04L 63/104 |
| | | 726/4 |
| 2015/0154418 A1* | 6/2015 | Redberg ................ H04L 9/0631 |
| | | 713/165 |
| 2015/0188927 A1 | 7/2015 | Santhi |
| 2015/0331635 A1 | 11/2015 | Ben-Shaul |
| 2017/0149784 A1 | 5/2017 | White, Jr. |
| 2017/0208118 A1 | 7/2017 | Luc |
| 2018/0083937 A1* | 3/2018 | Jahner ....................... G06F 8/60 |

* cited by examiner

TECHNOLOGIES FOR SECURELY EXTENDING CLOUD SERVICE APIS IN A CLOUD SERVICE MARKETPLACE

CROSS-REFERENCE TO RELATED APPLICATION

The present application is a continuation of and claims priority from U.S. application Ser. No. 15/393,354 filed on Dec. 29, 2016, the disclosure of which is hereby expressly incorporated herein by reference.

TECHNICAL FIELD OF THE DISCLOSED EMBODIMENTS

The presently disclosed embodiments generally relate to cloud service marketplaces, and more particularly, to technologies for extending cloud service application programming interfaces (APIs) in cloud service marketplaces.

BACKGROUND OF THE DISCLOSED EMBODIMENTS

Independent software vendors (ISVs) develop and sell software applications which are typically designed to run on one or more computer hardware or operating system platforms. Such software applications range from basic utility or productivity enhancing application to business process application for enterprises (e.g., customer relationship management (CRM), enterprise resource planning (ERP), automation tools, etc.). As cloud computing has become more pervasive, one such method of delivering software has been via the cloud using a software as a service (SaaS) based model. Using this delivery method, the ISVs may sell their software applications, or subscriptions to their software applications, through a public cloud or cloud marketplace.

A cloud marketplace provides an online storefront that allows customers access to cloud-based services and software applications. Such examples of cloud marketplaces include Amazon's Amazon Web Services® (AWS) Marketplace, Microsoft's Azure® Marketplace, Oracle's Marketplace, Salesforce's AppExchange®, and Ingram Micro's Cloud Marketplace. Certain SaaS based subscription services made accessible via a cloud marketplace can be subscribed to and/or used via an application programming interface (API) provided by the ISV that sits between the ISV and the cloud marketplace or other subscription management tool associated with the cloud marketplace. In such configurations, a cloud service broker may be used to facilitate the transaction between the ISV and an end user, reseller, retailer, etc., by using a plug-in or API connector for each cloud service.

In traditional cloud service broker implementations, each cloud service broker typically has a contract with each ISV for each cloud service; however, such an implementation is limited by a maximum number of contracts that can be supported (i.e., limited by the number of cloud services times the number of cloud service brokers). Other existing cloud service broker implementations rely on a central entity that will have contracts with each of the cloud service providers and the cloud service brokers; however, in such implementations, maximum number of contracts that can be supported is limited by the number of cloud services plus the number of cloud service brokers. Further, in such implementations only one set of credentials exists for each cloud service API, which are distributed to the cloud service brokers to provide access to the cloud services. Accordingly, the same credentials can be distributed among different cloud service brokers, which can result in one cloud service broker having access to API connectors of other cloud service brokers. There is, therefore, a need for securely extending cloud service APIs in cloud service marketplaces.

SUMMARY OF THE DISCLOSED EMBODIMENTS

In one aspect, a method for securely extending cloud service application programming interfaces (APIs) in a cloud service marketplace includes deploying, by a connector hub of a marketplace computing device, an API connector instance in a connection factory of the marketplace computing device, wherein the API connector instance comprises source code of an API connector usable to communicate with a remote API associated with a cloud service of the cloud service provider; transmitting, by the connector hub, provider provisioning channel credentials to the API connector instance and a cloud service provider interface of the cloud service provider; transmitting, by the connector hub, broker provisioning channel credentials to the API connector instance and a cloud service broker interface of the cloud service broker; and establishing, by the connector hub, a provisioning channel between the cloud service provider interface and the cloud service broker interface, wherein establishing the provisioning channel comprises establishing (i) a first communication channel between the API connector instance and the cloud service provider interface using the provider provisioning channel credentials to perform a first authentication operation, and (ii) a second communication channel between the API connector instance and the cloud service broker interface using the broker provisioning channel credentials to perform a second authentication operation.

In some embodiments, the method further includes generating, by the connector hub, proxy provisioning channel credentials; deploying, by the connector hub, an authentication proxy instance in the connection factory; and transmitting, by the connector hub, the proxy provisioning channel credentials to the API connector instance and the authentication proxy instance. In other embodiments, establishing the provisioning channel between the cloud service provider interface and the cloud service broker interface comprises establishing (i) a first communication channel between the API connector instance and the cloud service provider interface by using the provider provisioning channel credentials to perform a first authentication operation, (ii) a second communication channel between the authentication proxy instance and the cloud service broker interface by using the broker provisioning channel credentials to perform a second authentication operation, and (iii) a third communication channel between the API connector instance and the authentication proxy instance by using the proxy provisioning channel credentials to perform a third authentication operation.

In other embodiments, establishing the second communication channel between the authentication proxy instance and the cloud service broker interface includes transmitting an address of the authentication proxy instance to the cloud service broker interface, wherein the address is usable by the cloud service broker interface to initiate communications with the authentication proxy instance.

In still other embodiments, the method includes generating, by the connector hub, the provider provisioning channel credentials corresponding to the cloud service provider; and generating, by the connector hub, the broker provisioning channel credentials corresponding to the cloud service broker. In yet other embodiments, the method includes receiving, by the connector hub, an API connector provision notification from a cloud service broker marketplace of the marketplace computing device, wherein generating the broker provisioning channel credentials for the cloud service broker comprises generating the broker provisioning channel credentials in response to having received the API connector provision notification.

In some embodiments, the method includes receiving, by the connector hub, an indication from the cloud service provider that a new cloud service of the cloud service provider has been made available in the cloud service broker marketplace, wherein generating the provider provisioning channel credentials comprises generating the provider provisioning channel credentials in response to having received the indication. In other embodiments, storing, by the connector hub, the provider provisioning channel credentials in a credentials database of the connector hub; associating, by the connector hub, the provider provisioning channel credentials with the cloud service provider in the credentials database; storing, by the connector hub, the broker provisioning channel credentials in the credentials database in the credentials database; and associating, by the connector hub, the broker provisioning channel credentials with a cloud service broker. In still other embodiments, establishing the second communication channel between the API connector instance and the cloud service broker interface includes transmitting an address of the API connector instance to the cloud service broker interface, wherein the address is usable by the cloud service broker interface to initiate communications with the authentication proxy instance.

In another aspect, one or more computer-readable storage media comprising a plurality of instructions stored thereon that in response to being executed cause a connector hub of a marketplace computing device to deploy an API connector instance in a connection factory of the marketplace computing device, wherein the API connector instance comprises source code of an API connector usable to communicate with a remote API associated with a cloud service of the cloud service provider; transmit provider provisioning channel credentials to the API connector instance and a cloud service provider interface of the cloud service provider; transmit broker provisioning channel credentials to the API connector instance and a cloud service broker interface of the cloud service broker; and establish a provisioning channel between the cloud service provider interface and the cloud service broker interface, wherein to establish the provisioning channel comprises to establish (i) a first communication channel between the API connector instance and the cloud service provider interface using the provider provisioning channel credentials to perform a first authentication operation, and (ii) a second communication channel between the API connector instance and the cloud service broker interface using the broker provisioning channel credentials to perform a second authentication operation.

In some embodiments, the one or more computer-readable storage media of claim 9, wherein the plurality of instructions further cause the connector hub to generate proxy provisioning channel credentials; deploy an authentication proxy instance in the connection factory; and transmit the proxy provisioning channel credentials to the API connector instance and the authentication proxy instance, wherein to establish the provisioning channel between the cloud service provider interface and the cloud service broker interface comprises to establish (i) a first communication channel between the API connector instance and the cloud service provider interface by using the provider provisioning channel credentials to perform a first authentication operation, (ii) a second communication channel between the authentication proxy instance and the cloud service broker interface by using the broker provisioning channel credentials to perform a second authentication operation, and (iii) a third communication channel between the API connector instance and the authentication proxy instance by using the proxy provisioning channel credentials to perform a third authentication operation.

In other embodiments, to establish the second communication channel between the authentication proxy instance and the cloud service broker interface includes to transmit an address of the authentication proxy instance to the cloud service broker interface, wherein the address is usable by the cloud service broker interface to initiate communications with the authentication proxy instance.

In still other embodiments the plurality of instructions further cause the connector hub to generate the provider provisioning channel credentials corresponding to the cloud service provider; and generate the broker provisioning channel credentials corresponding to the cloud service broker. Additionally, in some embodiments, the plurality of instructions further cause the connector hub to receive an API connector provision notification from a cloud service broker marketplace of the marketplace computing device, wherein to generate the broker provisioning channel credentials for the cloud service broker comprises to generate the broker provisioning channel credentials in response to having received the API connector provision notification. Additionally or alternatively, in other embodiments, the plurality of instructions further cause the connector hub to receive an indication from the cloud service provider that a new cloud service of the cloud service provider has been made available in the cloud service broker marketplace, wherein to generate the provider provisioning channel credentials comprises to generate the provider provisioning channel credentials in response to having received the indication.

In some embodiments, the plurality of instructions further cause the connector hub to store the provider provisioning channel credentials in a credentials database of the connector hub; associate the provider provisioning channel credentials with the cloud service provider in the credentials database; store the broker provisioning channel credentials in the credentials database in the credentials database; and associate the broker provisioning channel credentials with a cloud service broker. In other embodiments, to establish the second communication channel between the API connector instance and the cloud service broker interface includes to transmit an address of the API connector instance to the cloud service broker interface, wherein the address is usable by the cloud service broker interface to initiate communications with the authentication proxy instance.

In still another aspect, a connector hub of a marketplace computing device for securely extending cloud service application programming interfaces (APIs) in a cloud service marketplace, wherein the cloud service marketplace includes a marketplace computing device, the marketplace computing device comprising a CPU; and a memory having stored therein a plurality of instructions that when executed by the processor cause a connector hub of the marketplace computing device to deploy an API connector instance in a connection factory of the marketplace computing device, wherein the API connector instance comprises source code of an API connector usable to communicate with a remote API associated with a cloud service of the cloud service provider; transmit provider provisioning channel credentials to the API connector instance and a cloud service provider interface of the cloud service provider; transmit broker provisioning channel credentials to the API connector instance and a cloud service broker interface of the cloud service broker; and establish a provisioning channel between the cloud service provider interface and the cloud service broker interface, wherein to establish the provisioning channel comprises to establish (i) a first communication channel between the API connector instance and the cloud service provider interface using the provider provisioning channel credentials to perform a first authentication operation, and (ii) a second communication channel between the API connector instance and the cloud service broker interface using the broker provisioning channel credentials to perform a second authentication operation.

In some embodiments, the one or more processors are further configured to execute the instructions to generate proxy provisioning channel credentials; deploy an authentication proxy instance in the connection factory; and transmit the proxy provisioning channel credentials to the API connector instance and the authentication proxy instance, wherein to establish the provisioning channel between the cloud service provider interface and the cloud service broker interface comprises to establish (i) a first communication channel between the API connector instance and the cloud service provider interface by using the provider provisioning channel credentials to perform a first authentication operation, (ii) a second communication channel between the authentication proxy instance and the cloud service broker interface by using the broker provisioning channel credentials to perform a second authentication operation, and (iii) a third communication channel between the API connector instance and the authentication proxy instance by using the proxy provisioning channel credentials to perform a third authentication operation.

In other embodiments, to establish the second communication channel between the authentication proxy instance and the cloud service broker interface includes to transmit an address of the authentication proxy instance to the cloud service broker interface, wherein the address is usable by the cloud service broker interface to initiate communications with the authentication proxy instance. In still other embodiments, the one or more processors are further configured to execute the instructions to generate the provider provisioning channel credentials corresponding to the cloud service provider; and generate the broker provisioning channel credentials corresponding to the cloud service broker. In some embodiments, the one or more processors are further configured to execute the instructions to receive an API connector provision notification from a cloud service broker marketplace of the marketplace computing device, wherein to generate the broker provisioning channel credentials for the cloud service broker comprises to generate the broker provisioning channel credentials in response to having received the API connector provision notification.

In other embodiments, the one or more processors are further configured to execute the instructions to receive an indication from the cloud service provider that a new cloud service of the cloud service provider has been made available in the cloud service broker marketplace, wherein to generate the provider provisioning channel credentials comprises to generate the provider provisioning channel credentials in response to having received the indication. In still other embodiments, the one or more processors are further configured to execute the instructions to store the provider provisioning channel credentials in a credentials database of the connector hub; associate the provider provisioning channel credentials with the cloud service provider in the credentials database; store the broker provisioning channel credentials in the credentials database in the credentials database; and associate the broker provisioning channel credentials with a cloud service broker. In yet still other embodiments, to establish the second communication channel between the API connector instance and the cloud service broker interface includes to transmit an address of the API connector instance to the cloud service broker interface, wherein the address is usable by the cloud service broker interface to initiate communications with the authentication proxy instance.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
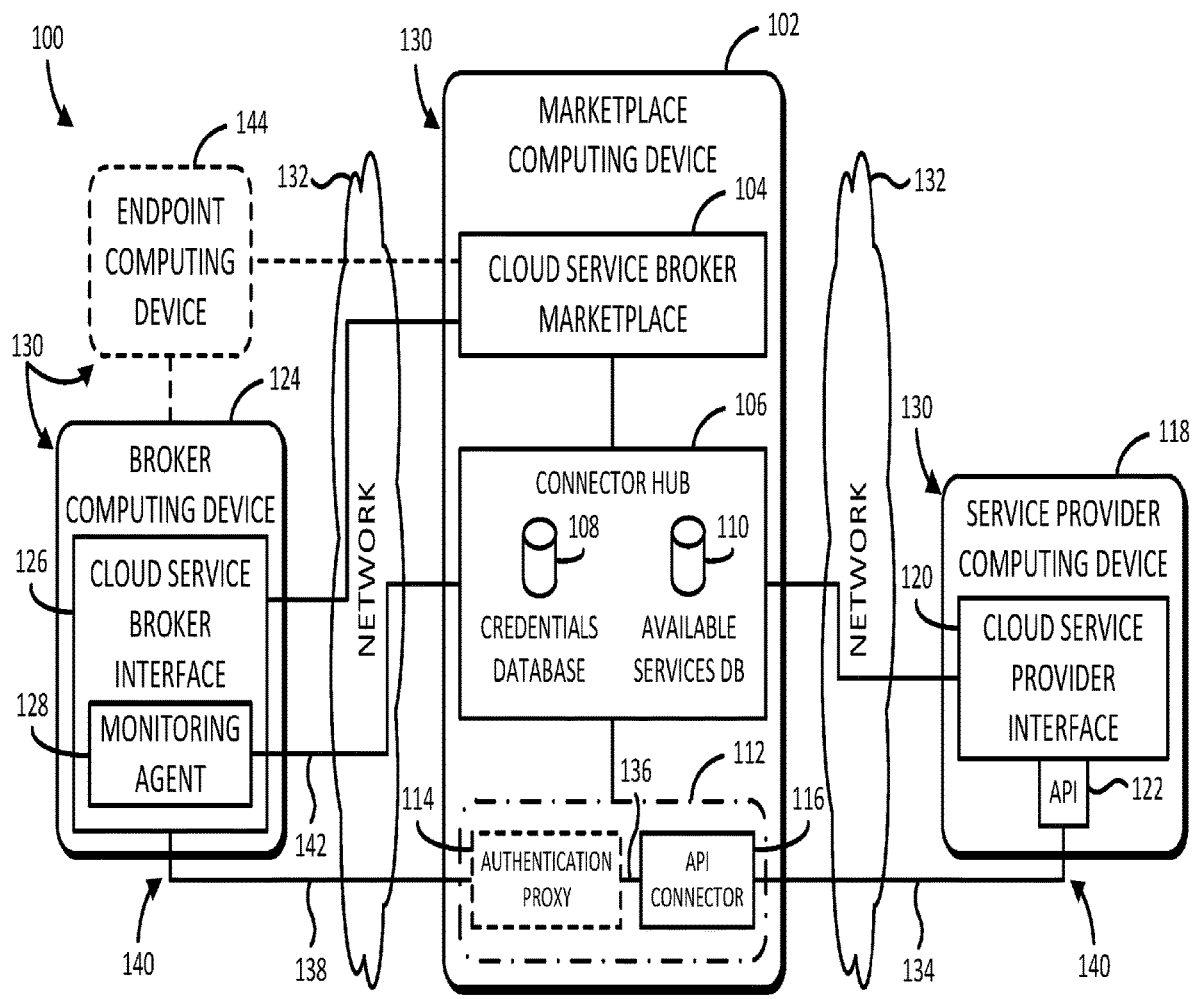
FIG. 1 is a block diagram of an illustrative embodiment of a cloud service marketplace system for securely extending cloud service application programming interfaces (APIs) that includes a broker computing device and a service provider computing device, each of which are communicatively coupled to a marketplace computing device.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a cloud service marketplace system 100 for securely extending cloud service application programming interfaces (APIs). The cloud service marketplace system 100 includes a service provider computing device 118 and a broker computing device 124, each of which are communicatively coupled to a marketplace computing device 102 (e.g., via a network 132). The illustrative marketplace computing device 102 includes a connector hub 106 that is configured to establish a provisioning channel (see, e.g., the provisioning channel 140) between a cloud service provider interface 120 of the service provider computing device 118 and a cloud service broker interface 126 of the broker computing device 124 to allow a cloud service broker to sell licenses for particular cloud services to end-users (e.g., a customer, a broker, a re-seller, etc.) via their cloud service broker interface 126.

To do so, as will be described in further detail below, the connector hub 106 is configured to replicate an instance of an API connector (see, e.g., the API connector instance 116 of the connector factory 112 of FIG. 1) corresponding to a cloud service that was previously received from a cloud service provider, generate provisioning channel credentials, and orchestrate the establishment of a provisioning channel (see, e.g., the provisioning channel 140 of FIG. 1) between the cloud service provider interface 120 and the cloud service broker interface 126 through the API connector instance using the generated provisioning channel credentials. It should be appreciated that the provisioning channel credentials may be any type of information (e.g., cryptographic keys or other arbitrary data) that is usable to authenticate a secure communication channel between two entities using the provisioning channel credentials.

Subsequent to the provisioning channel 140 having been established, the cloud service broker may then rsell licenses for that cloud service to end-users via their the cloud service broker interface 126. Accordingly, unlike present technologies in which the API connectors, and therefore the credentials of each cloud service broker, are managed by the cloud service brokers, the illustrative marketplace computing device 102 is configured to securely extend the cloud service APIs by eliminating the exposure of credentials (i.e., credentials specific to a particular cloud service broker or particular cloud service) between cloud service brokers and/or cloud service providers.

In an illustrative example, a cloud service provider (e.g., an independent software vendor (ISV)) contracts with a controlling entity of a cloud service marketplace to facilitate the sale of a license to an end-user. The license may then allow that end-user, or other end-user(s) associated therewith, certain access to the cloud service provider's cloud services (e.g., cloud-based software as a service (SaaS) application(s)). In the illustrative cloud service marketplace system 100, the marketplace computing device 102 is configured to manage licenses to various cloud services between cloud service providers and cloud service brokers.

In use, the cloud service provider develops an API (see, e.g., the API 122 of FIG. 1) and an API connector for each of their cloud services, and delivers the API connector and other information of the cloud service (e.g., cloud service address, default settings, pricing information, sales templates, an identifier of the cloud service, etc.) to the connector hub 106 of the marketplace computing device 102. In some embodiments, the API connector may be in the form of source code usable to create a replicated instance of that API connector (see, e.g., the API connector instance 116 of the connector factory 112 of FIG. 1). Each API 122 is configured to receive commands from the cloud service (e.g., via the cloud service provider interface 120 of the service provider computing device 118) and transmit the received commands to the API connector instance 116 to which the API is connected, and vice versa. Additionally, each API connector instance 116 is configured to receive/transmit commands to/from the corresponding API 122 to which it is communicatively coupled.

In furtherance of the illustrative example, a cloud service broker (i.e., a distributor, reseller, etc.) contracts with the controlling entity of the cloud service broker marketplace (see, e.g., the cloud service broker marketplace 104) to authorize access to sell/distribute licenses to certain cloud services that are offered in the cloud service broker marketplace 104. In other words, the cloud service broker serves as an intermediary between the cloud service marketplace and potential end-users by providing a cloud service portfolio to the end-users that includes each of the cloud services for which that service broker has been authorized to provide, thereby adding a layer of security therebetween.

To offer the available cloud services to the cloud service brokers, the cloud service broker marketplace 104 provides an interface usable to view and select which cloud services the cloud service broker would like to offer for sale. It should be appreciated that the cloud service broker marketplace 104 may only show those cloud services for which the respective cloud service provider has previously provided a corresponding API connector to the connector hub 106. Accordingly, each cloud service broker may then add available cloud services to their cloud service portfolio by accessing the cloud service broker marketplace 104. In some embodiments, the cloud service broker may access the cloud service broker marketplace 104 via the broker computing device 124, or more particularly, the cloud service broker interface 126 of the broker computing device 124. In other embodiments, the cloud service broker may access the cloud service broker marketplace 104 via an endpoint computing device 144 communicatively coupled to the cloud service broker marketplace 104.

As described previously, the connector hub 106 is configured to establish the provisioning channel 140 between the cloud service broker interface 126 and the cloud service provider interface 120. To do so, as will be described in further detail below, the connector hub 106 deploys an API connector instance 116 (i.e., a replicated instance of the API connector received from the cloud service provider) in the connector factory 112. The connector hub 106 additionally orchestrates the establishment of a series of secure communication channels between the cloud service provider interface 120 (see, e.g., the communication channel 134) and the API connector instance 116, and between the API connector instance 116 and the cloud service broker interface 126 (see, e.g., the communication channel 138) using provisioning channel credentials generated by the connector hub 106.

In some embodiments, the connector hub 106 is additionally configured to deploy an instance of an authentication proxy 114 (see, e.g., the API connector instance 116 of the connector factory 112 of FIG. 1) when the API connector instance 116 is deployed. In such embodiments, the authentication proxy instance 114 can be deployed in the connector factory 112 between the cloud service broker interface 126 and the API connector instance 116 (i.e., in the communication channel 138). Additionally, in such embodiments, the connector hub 106 may be further configured to orchestrate the establishment of a secure communication channel (see, e.g., the communication channel 136) between the authentication proxy 114 and the API connector instance 116, such as may be established using provisioning channel credentials. Accordingly, in such embodiments, the authentication proxy 114 acts as an additional layer of security. Additionally, the authentication proxy 114 can maintain the established connection with the cloud service broker interface 126, even if the API connector instance 116 has changed. It should be appreciated that one or more of the secure communication channels 134, 136, and 138 may be secured using technologies known to those of skill in the art.

In some embodiments, the connector hub 106 may be additionally configured to notify a monitoring agent (see, e.g., the monitoring agent 128) of the cloud service broker interface 126 each time a replicated API connector instance 116 associated with that cloud service broker interface 126 is deployed. Accordingly, upon establishing the provisioning channel 140 for that cloud service, end-users associated with the cloud service broker may purchase licenses from the cloud service broker (e.g., via the cloud service broker interface 126) for that cloud service.

Figure 2:
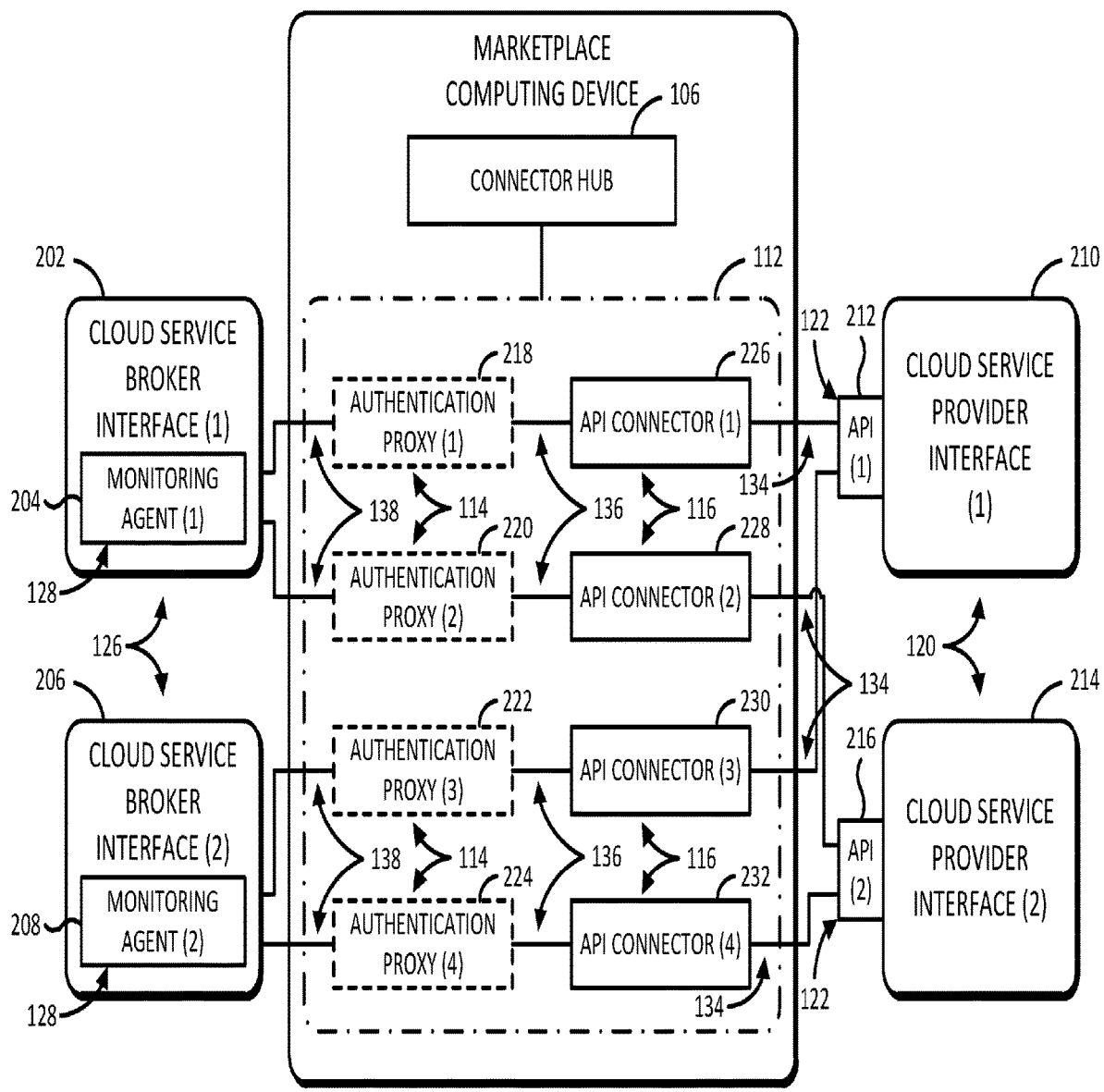
FIG. 2 is a block diagram of multiple provisioning channels having been established between cloud service brokers and cloud service providers of the cloud service marketplace system of FIG. 1.

Referring now to FIG. 2, multiple provisioning channels 140 are shown as having been established between more than one cloud service broker interfaces and more than one cloud service providers of the cloud service marketplace system 100 of FIG. 1. The illustrative cloud service broker interfaces 126 includes a first cloud service broker interface, designated as cloud service broker interface (1) 202, and a second cloud service broker interface, designated as cloud service broker interface (2) 206. The illustrative cloud service broker interface 202 includes a monitoring agent 128, designated as monitoring agent (1) 204 and the illustrative cloud service broker interface 206 includes a monitoring agent 128, designated as monitoring agent (2) 208. It should be appreciated that any number of cloud service broker interfaces 126 may be present in other embodiments.

The illustrative cloud service provider interfaces 120 includes a first cloud service provider interface, designated as cloud service provider interface (1) 210, and a second cloud service provider interface, designated as cloud service provider interface (2) 214. As described previously, each cloud service provider includes an API 122 that is usable to communicate with an API connector instance 116 that is associated with the cloud service to which the API 122 is developed to communicate with. The illustrative cloud service provider interface (1) includes a first API, designated as API (1) 212, and the illustrative cloud service provider interface (2) includes a second API, designated as API (2) 216. It should be appreciated that any number of cloud service provider interfaces 120 may be present in other embodiments. It should be further appreciated that, in other embodiments, each of the cloud service provider interfaces 120 may include multiple APIs 122.

As described previously, the connector hub 106 is configured to establish the provisioning channels 140 between the cloud service provider interfaces 120 and the cloud service broker interfaces 126 by replicating instances of the API connector received from the respective cloud service provider interface 120 that is configured to communicate with the corresponding API 122. In the illustrative connector factory 112, four provisioning channels 140 are shown that are each comprised of an API connector instance 116 corresponding to the applicable API 122 to which they are associated and, in some embodiments, an authentication proxy instance 114.

The illustrative API connector instances 116 include a first API connector instance, designated as API connector (1) 226, a second API connector instance, designated as API connector (2) 228, a third API connector instance, designated as API connector (3) 230, and a fourth API connector instance, designated as API connector (4) 232. The illustrative authentication proxies 114 include a first authentication proxy instance, designated as authentication proxy (1) 218, a second authentication proxy instance, designated as authentication proxy (2) 220, a third authentication proxy instance, designated as authentication proxy (3) 222, and a fourth authentication proxy instance, designated as authentication proxy (4) 224.

It should be appreciated that each of the four API connectors 116 shown in FIG. 2 (i.e., API connectors instances 226, 228, 230, 232) are replications of a respective API connector received from the corresponding cloud service provider that are deployed to establish a provisioning channel 140 therebetween. As shown, API connector (1) 226 and API connector (3) 230 are associated with API (1) 212 of cloud service provider interface (1) 210, while API connector (2) 228 and API connector (4) 232 are associated with API (2) 216 of cloud service provider interface (2) 214. Additionally, API connector (1) 226 and API connector (2) 228 are associated with cloud service broker interface (1) 202, while API connector (3) 230 and API connector (4) 232 are associated with cloud service broker interface (2) 206.

Referring back to FIG. 1, as shown in the illustrative cloud service marketplace system 100, each of the marketplace computing device 102, the service provider computing device 118, the broker computing device 124, and the endpoint computing device 144 may be embodied as any type of computing device 130. In other words, each of the respective computing devices 130 may be embodied as any type of compute and/or storage device capable of performing the functions described herein. It should be appreciated that one or more of the respective computing devices 130 may be embodied as a embodied as one or more servers (e.g., stand-alone, rack-mounted, etc.) and/or combination of compute blades and data storage devices (e.g., of a storage area network (SAN)) in a cloud architected network or data center, while one or more of the respective computing devices may be embodied as a desktop computer, a mobile computing device (e.g., smartphones, wearables, tablets, laptops, notebooks, etc.), or any other type of "smart" or otherwise Internet-connected device.

Figure 3:
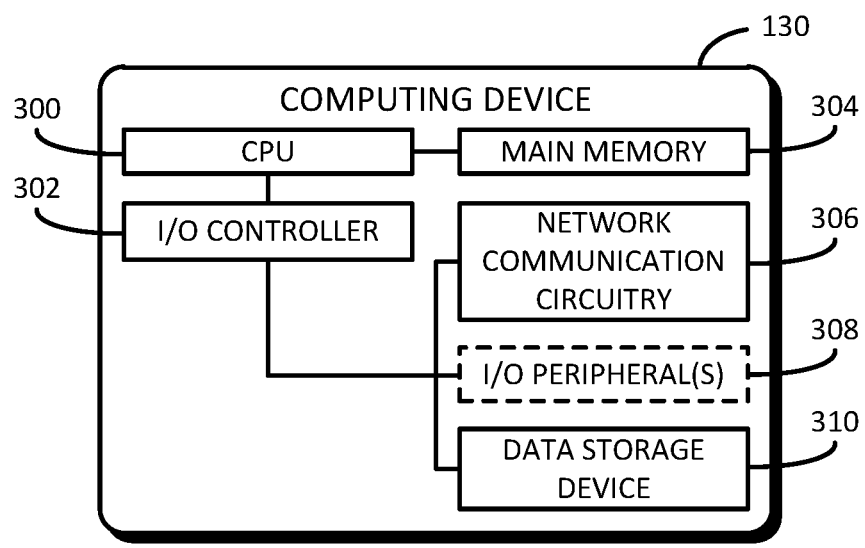
FIG. 3 is a block diagram of an illustrative embodiment of one of the computing devices of the cloud service broker marketplace of the marketplace computing device of FIG. 1.

Referring now to FIG. 3, an illustrative embodiment of a computing device 130 representative of one or more of the marketplace computing device 102, the service provider computing device 118, the broker computing device 124, and the endpoint computing device 144 is shown. The illustrative computing device 130 includes a central processing unit (CPU) 300, an input/output (I/O) controller 302, a memory 304, a network communication circuitry 306, and a data storage device 310, as well as, in some embodiments, one or more I/O peripherals 308. In some embodiments, one or more of the illustrative components may be combined on a single system-on-a-chip (SoC) on a single integrated circuit (IC). It should be appreciated that alternative embodiments may include additional, fewer, and/or alternative components to those of the illustrative computing device 130, such as a graphics processing unit (GPU), a power supply, etc., which are not shown to preserve clarity of the description. It should be further appreciated that the type of storage/compute components of the respective computing device 130 may be predicated upon the type and intended use of the respective computing device 130.

The CPU 300, or processor, may be embodied as any type of hardware or combination of circuitry capable of processing data. Accordingly, the CPU 300 may include one processing core (not shown) in a single-core processor architecture, or multiple processing cores in a multi-core processor architecture. Irrespective of the number of processing cores, the CPU 300 is capable of reading and executing program instructions. In some embodiments, the CPU 300 may include cache memory (not shown) that may be integrated directly with the CPU 300 or placed on a separate chip with a separate interconnect to the CPU 300. It should be appreciated that, in some embodiments, pipeline logic may be used to perform software and/or hardware operations (e.g., network traffic processing operations), rather than commands issued to/from the CPU 300.

The I/O controller 302, or I/O interface, may be embodied as any type of computer hardware or combination of circuitry capable of interfacing between input/output devices and the computing device 130. Illustratively, the I/O controller 302 is configured to receive input/output requests from the CPU 300, and send control signals to the respective input/output devices, thereby managing the data flow to/from the computing device 130.

The memory 304 may be embodied as any type of computer hardware or combination of circuitry capable of holding data and instructions for processing. Such memory 304 may be referred to as main or primary memory. It should be appreciated that, in some embodiments, one or more components of the computing device 130 may have direct access to memory, such that certain data may be stored via direct memory access (DMA) independently of the CPU 300.

The network communication circuitry 306 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 306 may include a network interface controller (NIC) capable of being configured to connect the computing device 130 to a computer network (e.g., the network 106), as well as other computing devices of the cloud service marketplace system 100.

The one or more I/O peripherals 308 may be embodied as any auxiliary device configured to connect to and communicate with the computing device 130. For example, the I/O peripherals 308 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output).

In some embodiments, the I/O peripherals 308 may be connected to the computing device 130 via a cable (e.g., a ribbon cable, a wire, a universal serial bus (USB) cable, a high-definition multimedia interface (HDMI) cable, etc.) of the computing device 130. In such embodiments, the cable is connected to a corresponding port (not shown) of the computing device 130 for which the communications made therebetween can be managed by the I/O controller 302. In alternative embodiments, the I/O peripherals 308 may be connected to the computing device 130 via a wireless mode of communication (e.g., Bluetooth®, Wi-Fi®, etc.) which can be managed by the network communication circuitry 306.

The data storage device 310 may be embodied as any type of computer hardware capable of the non-volatile storage of data (e.g., semiconductor storage media, magnetic storage media, optical storage media, etc.). Such data storage devices 310 are commonly referred to as auxiliary or secondary storage, and are typically used to store a large amount of data relative to the memory 304 described above.

Referring back to FIG. 1, the illustrative cloud service marketplace system 100 includes a network 132 that is usable for the other computing devices 130 to communicate with the marketplace computing device 102. The network 132 may be implemented as any type of wired and/or wireless network, including a local area network (LAN), a wide area network (WAN), a metropolitan area network (MAN), a global network (the Internet), etc. Accordingly, the network 132 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc.

For example, one or more of such network computing devices may be configured to couple the endpoint computing device 144 to the network 132 in a LAN configuration using wired (e.g., Ethernet, token ring, etc.) and/or wireless (e.g., Bluetooth®, Wi-Fi®, wireless broadband, ZigBee®, etc.) communication technologies and associated protocols. In furtherance of the example, the LAN may be coupled (e.g., via coaxial, mobile telephony, fiber, etc.) to one or more larger area networks (e.g., WANs, metropolitan area networks (MANs), the Internet, etc.) via additional network computing devices of the network 132.

Each of the cloud service provider interface 120 and the cloud service broker interface 126 may be embodied as any combination of software, hardware, firmware, and circuitry capable of performing the functions described herein. In some embodiments, one or both of the cloud service provider interface 120 and the cloud service broker interface 126 may be configured to render information (e.g., via a user interface (UI)) to a display of the service provider computing device 118 and the broker computing device 114, respectively. In such embodiments, the one or both of the cloud service provider interface 120 and the cloud service broker interface 126 may be configured to relay inputs received from a user to login, configure the respective interface, or manipulate information (e.g., settings) associated therewith.

Figure 4:
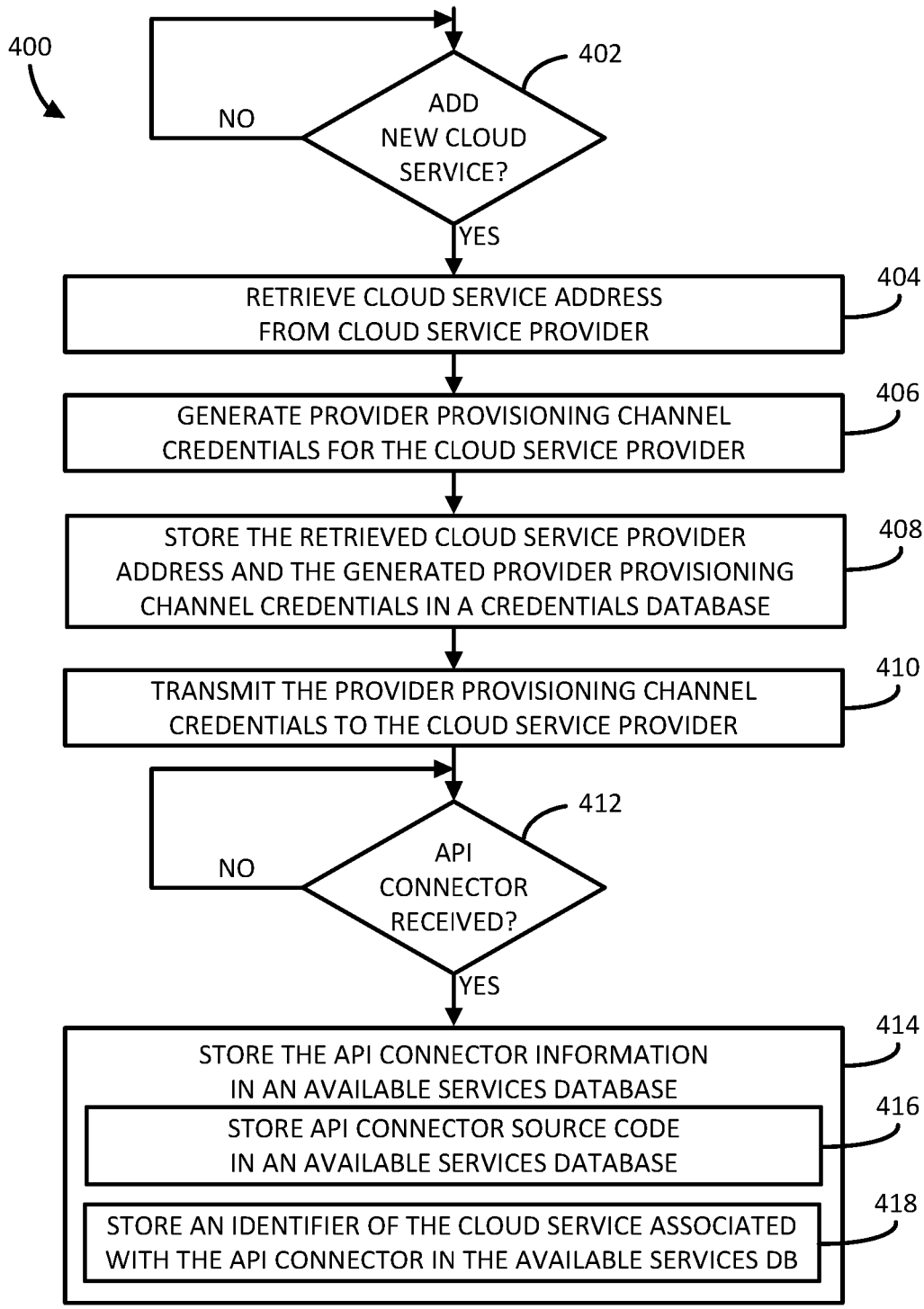
FIG. 4 is a schematic flow diagram of an illustrative method for adding a new cloud service to the cloud service marketplace system of FIG. 1 that may be performed by a connector hub of the marketplace computing device of the cloud service marketplace system.

Referring now to FIG. 4, an illustrative method 400 is provided for adding a new cloud service to a cloud service broker marketplace (e.g., the cloud service broker marketplace 104 of FIG. 1) that may be performed by a marketplace computing device (e.g., the marketplace computing device 102 of FIG. 1), or more particularly by a connector hub (e.g., the connector hub 106 of FIG. 1) of the marketplace computing device 102. To do so, in block 402, the connector hub 106 determines whether a new cloud service is to be added to the available cloud services of the cloud service broker marketplace 104. Such a determination may be based on whether an indication was received by the connector hub 106 (e.g., from the cloud service provider interface 120) that indicates to add the new cloud service to the cloud service broker marketplace 104.

If connector hub 106 determines that a new cloud service is to be added, the method 400 advances to block 404. In block 404, the connector hub 106 retrieves an address (e.g., a uniform resource identifier (URI)) associated with the cloud service accessible via a cloud service provider interface (e.g., the cloud service provider interface 120 of FIG. 1) of the service provider computing device 118. In block 406, the connector hub 106 generates provisioning channel credentials (i.e., provider provisioning channel credentials) for the cloud service provider. It should be appreciated that, in some embodiments, the provider provisioning channel credentials may be received from a cloud service provider (e.g., generated by and received via the cloud service provider interface 120). In block 408, the connector hub 106 stores the retrieved cloud service provider address and the provider provisioning channel credentials generated in block 406 to a secure database local to the connector hub 106 (e.g., the credentials database 108 of FIG. 1), such as may be secured using technologies known in the art (e.g., a hardware security module). In block 410, the connector hub 106 transmits the provider provisioning channel credentials to the cloud service provider interface 120.

In block 412, the connector hub 106 determines whether an API connector has been received from the cloud service provider (e.g., via the cloud service provider interface 120). As described previously, the API connector may be comprised of source code usable to replicate an instance of the API connector. It should be appreciated that addition information related to the API connector may be received with the API connector in block 412. Such additional information may include an identifier of the API connector. If the API connector has been received, the method 400 advances to block 414, in which the connector hub 106 stores the API connector received in block 412 into a secure database local to the connector hub 106 (e.g., the available services database 110 of FIG. 1), such as may be secured using technologies known in the art (e.g., a hardware security module). Additionally, in block 416, the connector hub 106 stores the source code of the API connector in the available services database 110. Further, in block 418, the connector hub stores an identifier of the cloud service associated with the API connector received in block 412 in the available services database 110.

Figure 5:
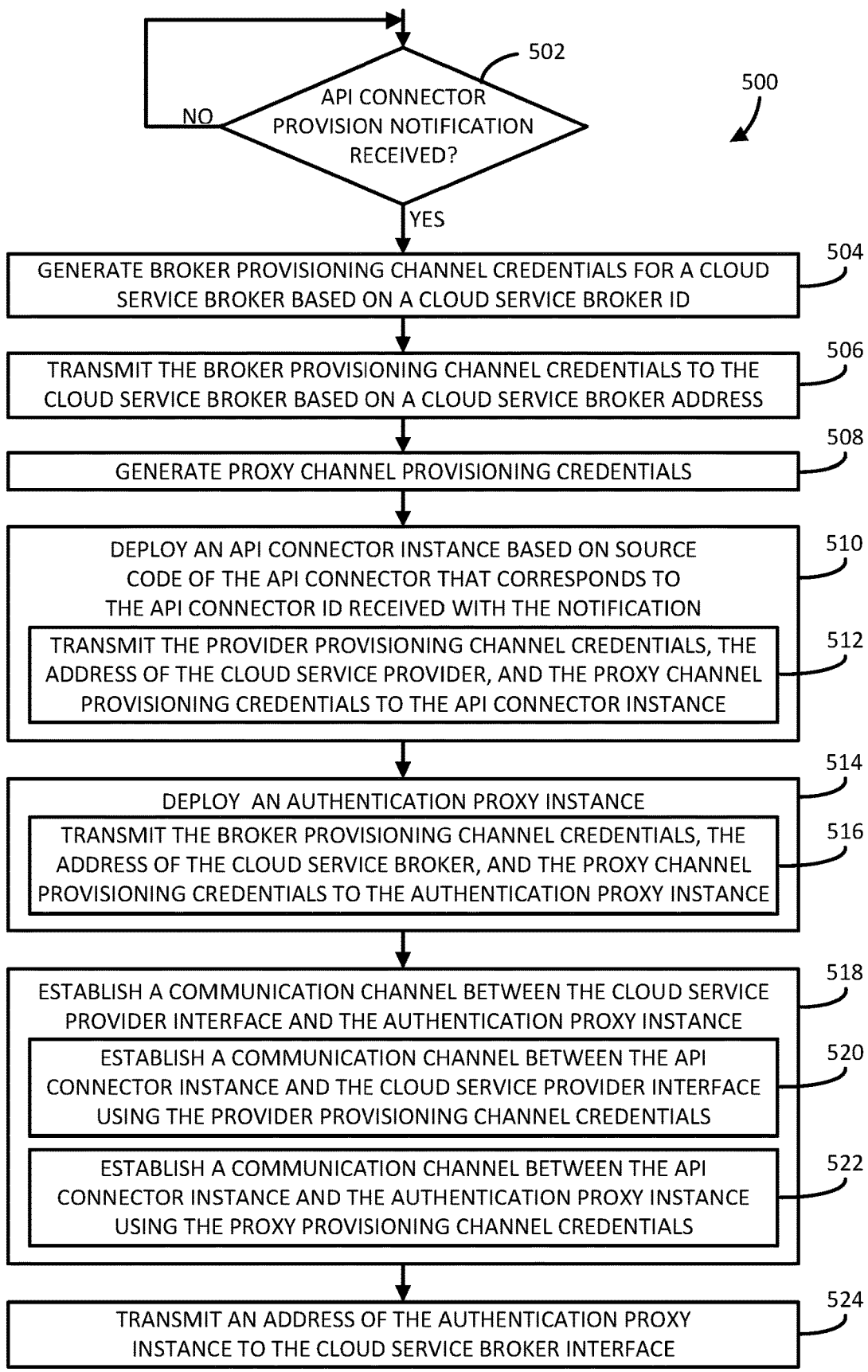
FIG. 5 is a schematic flow diagram of an illustrative method for establishing a provisioning channel between the cloud service provider and the marketplace computing device of FIG. 1 for a particular cloud service broker that may be performed by a connector hub of the marketplace computing device.
Figure 6:
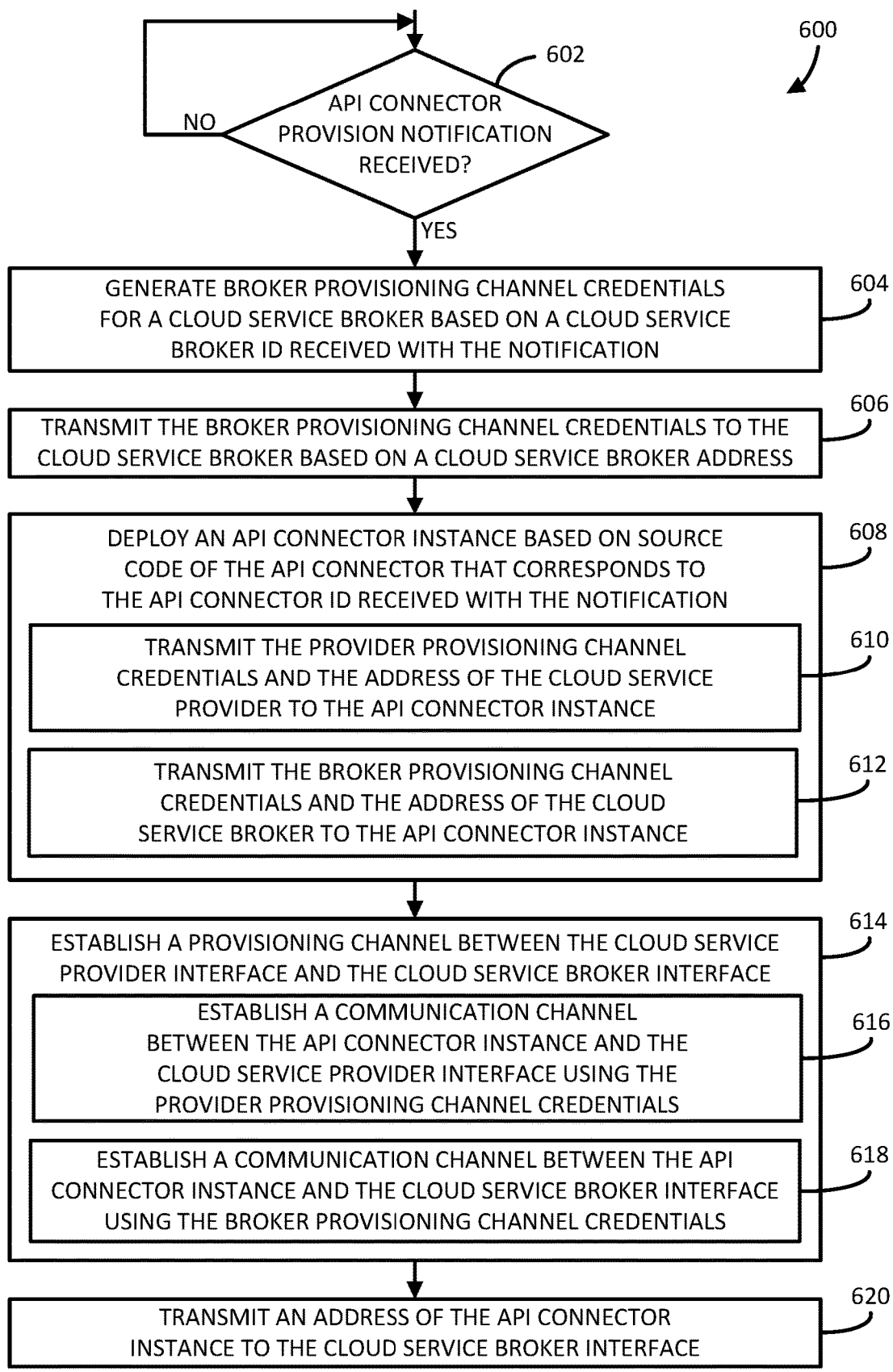
FIG. 6 is a schematic flow diagram of another illustrative method for establishing a provisioning channel between the cloud service provider and the marketplace computing device of FIG. 1 for a particular cloud service broker that may be performed by a connector hub of the marketplace computing device.

Referring now to FIGS. 5 and 6, illustrative methods 500, 600 are provided for establishing a provisioning channel (e.g., the provisioning channel 140 of FIG. 1) between a cloud service provider interface (e.g., the cloud service provider interface 120 of FIG. 1) and a cloud service broker interface (e.g., the cloud service broker interface 126 of FIG. 1) that may be performed by the marketplace computing device 102, or more particularly by a connector hub (e.g., the connector hub 106 of FIG. 1) of the marketplace computing device 102. As described previously, an authentication proxy instance (e.g., the authentication proxy instance 114 of FIG. 1) may be deployed in establishing the provisioning channel. In FIG. 5, the illustrative method 500 describes an embodiment in which the authentication proxy instance 114 is deployed in the provisioning channel 140. In FIG. 6, the illustrative method 600 describes an embodiment in which the authentication proxy instance 114 is not deployed in the provisioning channel 140.

As shown in FIG. 5, the method 500 begins in block 502, in which the connector hub 106 determines whether an API connector provision notification has been received. In some embodiments, the API connector provision notification may be received from the cloud service broker marketplace 104, which was generated in response to a cloud service broker having requested that an available cloud service be added to their cloud service portfolio. If the connector hub 106 determines that an API connector provision notification has been received, the method 500 advances to block 504.

In block 504, the connector hub 106 generates broker provisioning channel credentials for a cloud service broker associated with the API connector provision notification received in block 502 (e.g., based on an identifier of that cloud service broker received with the API connector provision notification in block 502). It should be appreciated that the connector hub 106 may be configured to store the generated broker provisioning channel credentials in a credentials database local to the connector hub 106 (e.g., the credentials database 108 of FIG. 1). In block 506, the connector hub 106 transmits the broker provisioning channel credentials to a cloud service broker based on an address of the cloud service broker received with the API connector provision notification. It should be appreciated that the connector hub 106 may be configured to store the cloud service broker address in a database, such as the credentials database 108. In block 508, the connector hub 106 generates proxy channel provisioning channel credentials.

In block 510, the connector hub 106 deploys an API connector instance (e.g., the API connector instance 116 of FIG. 1) based on source code of the API connector retrieved from an available services database (e.g., the available service database 110 of FIG. 1) using an identifier of the API connector that was received with the API connector provision notification in block 502 to perform the API connector lookup on the available service database 110.

In block 512, the connector hub 106 transmits provider provisioning channel information to the API connector instance 116 that is usable to establish the communication channel (e.g., the communication channel 134 of FIG. 1) between the cloud service provider interface 120 and the API connector instance 116. Accordingly, such provider provisioning channel information includes the provider provisioning channel credentials associated with the cloud service provider to which an identifier of the cloud service corresponds and the address of the cloud service provider. Additionally, in block 512, the connector hub 106 further transmits proxy provisioning channel information to the API connector instance 116 that is usable to establish the communication channel (e.g., the communication channel 136 of FIG. 1) between the API connector instance 116 and an authentication proxy instance. Accordingly, such proxy channel provisioning information includes the proxy channel provisioning channel credentials.

In block 514, the connector hub 106 deploys an authentication proxy instance (e.g., the authentication proxy instance 114 of FIG. 1). Additionally, in block 516, the connector hub 106 transmits broker provisioning channel information to the authentication proxy instance 114 that is usable to establish the communication channel between the authentication proxy instance 114 and the cloud service broker interface 126 (e.g., the communication channel 138 of FIG. 1). Such broker provisioning channel information includes the broker provisioning channel credentials associated with the cloud service broker to which the cloud service broker identifier corresponds and the address of the cloud service broker. The connector hub 106, in block 516, further transmits proxy provisioning channel credentials to the authentication proxy instance 114 that are usable to establish the communication channel between the API connector instance 116 and the authentication proxy instance 114 (e.g., the communication channel 136 of FIG. 1).

In block 518, the connector hub 106 establishes a portion of the provisioning channel 140 between the cloud service provider interface 120 and the authentication proxy instance 114. To do so, in block 520, the connector hub 106 establishes the communication channel 134 between the API connector instance 116 and the cloud service provider interface 120 using the provider provisioning channel credentials. Additionally, in block 522, the connector hub 106 establishes the communication channel 136 between the API connector instance 116 and the authentication proxy instance 114 using the proxy provisioning channel credentials (i.e., to verify to each other entity that they are who they claim to be) using any authentication operation(s) known to those of skill in the art.

It should be appreciated that subsequent to establishing the portion of the provisioning channel 140 described in FIG. 5, the remaining portion of the provisioning channel 140 (i.e., the communication channel 138 between the cloud service broker interface 126 and the authentication proxy instance 114) remains to be established. To establish the communication channel 138, in block 524, the connector hub 106 transmits a message that includes an address (e.g., a URI) of the API connector instance 116, which is usable to establish a communication channel (e.g., the communication channel 138) between the authentication proxy instance 114 and the cloud service broker interface 126. In some embodiments, the message indicating the authentication proxy instance 114 has been deployed may be placed in a message queue from which the notifications are either pushed by the connector hub 106 or pulled by the cloud service broker interface 126.

In some embodiments, a monitoring agent (e.g., the monitoring agent 128 of FIG. 1) may have been previously deployed on a cloud service broker (e.g., the cloud service broker interface 126) that is usable to receive/retrieve the indication. In such embodiments, upon detection of the indication, the monitoring agent 128 may initiate the establishment of the communication channel 138 between the cloud service broker interface 126 and the authentication proxy instance 114 using the broker provisioning channel credentials (see, e.g., the method 700 of FIG. 7). Accordingly, the indication includes an address (e.g., in a URI) of the authentication proxy instance 114 deployed in block 608 that usable by the monitoring agent 128 to establish the communication channel 138 and complete the provisioning channel 140. It should be appreciated that, in alternative embodiments that do not include the monitoring agent 128, the configuration of the communication channel 138 may be performed manually at the cloud service broker interface 126.

In an illustrative example, as shown in FIG. 2, a communication channel 134 is established between the cloud service provider interface (1) 210 and the cloud service broker interface (1) 202. To do so, in use, the API connector (1) 226 establishes the communication channel 134 with the cloud service provider interface (1) 210, via the API (1) 212, by performing an authentication operation using the provider provisioning channel credentials previously transmitted to the API connector (1) 226 and the cloud service provider interface (1) 210. Similarly, another communication channel 134 is established between the cloud service provider interface (2) 214 and the cloud service broker interface (1) 202. To do so, in use, the API connector (1) 228 establishes the communication channel 134 with the cloud service provider interface (2) 214, via the API (2) 216, by performing an authentication operation using the provider provisioning channel credentials previously provided to the API connector (1) 228 and the cloud service provider interface (2) 214.

In furtherance of the illustrative example, a communication channel 136 is established between the API connector (1) 226 and the authentication proxy (1) 218 by performing an authentication operation using the proxy provisioning channel credentials associated with the API connector (1) 226 and the authentication proxy (1) 218. Similarly, another communication channel 136 is established between the API connector (2) 228 and the authentication proxy (2) 220 by performing an authentication operation using the proxy provisioning channel credentials associated with the API connector (2) 228 and the authentication proxy (2) 220.

Additionally, in furtherance of the illustrative example, a communication channel 138 is established between the cloud service broker interface (1) 202 and the authentication proxy (1) 218. To do so, in use, the cloud service broker interface (1) 202 and the authentication proxy (1) 218 perform an authentication operation using the broker provisioning channel credentials previously provided to the cloud service broker interface (1) 202 and the authentication proxy (1) 218. Similarly, another communication channel 138 is established between the cloud service broker interface (1) 202 and the authentication proxy (2) 220. To do so, in use, the cloud service broker interface (1) 202 and the authentication proxy (2) 220 perform an authentication operation using the broker provisioning channel credentials previously provided to the cloud service broker interface (1) 202 and the authentication proxy (2) 220.

It should be appreciated, as described previously, that an authentication proxy instance 114 may not be deployed in some embodiments. In such embodiments, the communication channel 138 extends from the respective cloud service broker interface 126 directly to the respective API connector instance 116. Irrespective of whether the authentication proxy instance 114 is deployed in the provisioning channel or not, unlike present technologies, neither the cloud service provider interfaces 120 nor the cloud service broker interfaces 126 have access to the other's provisioning channel credentials, thereby providing a secure extension of the respective APIs 122 of cloud service providers.

As shown in FIG. 6, the method 600 begins in block 602, in which the connector hub 106 determines whether an API connector provision notification has been received. In some embodiments, the API connector provision notification may be received from the cloud service broker marketplace 104, which was generated in response to a cloud service broker having requested that an available cloud service be added to their cloud service portfolio. If the connector hub 106 determines that an API connector provision notification has been received, the method 600 advances to block 604.

In block 604, the connector hub 106 generates broker provisioning channel credentials for a cloud service broker associated with the API connector provision notification received in block 602 (e.g., based on an identifier of that cloud service broker received with the API connector provision notification in block 602). It should be appreciated that the connector hub 106 may be configured to store the generated broker provisioning channel credentials in a credentials database local to the connector hub 106 (e.g., in the credentials database 108 of FIG. 1). It should be further appreciated that, in some embodiments, the broker provisioning channel credentials may be received from a cloud service broker (e.g., generated by and received via the cloud service broker interface 126). In block 606, the connector hub 106 transmits the broker provisioning channel credentials to a cloud service broker based on an address of the cloud service broker received with the API connector provision notification. It should be appreciated that the connector hub 106 may be configured to store the cloud service broker address in a database, such as the credentials database 108.

In block 608, the connector hub 106 deploys an API connector instance (e.g., the API connector instance 116 of FIG. 1) based on source code of the API connector retrieved from an available services database (e.g., the available service database 110 of FIG. 1) using an identifier of the API connector that was received with the API connector provision notification in block 602 to perform the API connector lookup on the available service database 110. Additionally, in block 610, the connector hub 106 transmits provider provisioning channel information to the API connector instance 116 that is usable to establish the communication channel (e.g., the communication channel 134 of FIG. 1) between the cloud service provider interface 120 and the API connector instance 116. Accordingly, such provider provisioning channel information includes the provider provisioning channel credentials associated with the cloud service provider to which an identifier of the cloud service corresponds and the address of the cloud service provider.

Further, in block 612, the connector hub 106 transmits broker provisioning channel information to the API connector instance 116 that is usable to establish a communication channel between the API connector instance 116 and the cloud service broker interface 126 (e.g., the communication channel 138 of FIG. 1). Such broker provisioning channel information includes the broker provisioning channel credentials associated with the cloud service broker to which the cloud service broker identifier corresponds and the address of the cloud service broker.

In block 614, the connector hub 106 establishes a provisioning channel between the cloud service provider interface 120 and the cloud service broker interface 126. To do so, in block 616, the connector hub 106 establishes the communication channel 134 between the API connector instance 116 and the cloud service provider interface 120 using the provider provisioning channel credentials. Additionally, in block 618, the connector hub 106 establishes communication channel 138 between the API connector instance 116 and the cloud service broker interface 126 using the broker provisioning channel credentials. In block 620, the connector hub 106 transmits a message that includes an address (e.g., a URI) of the API connector instance 116, which is usable to establish a communication channel (e.g., the communication channel 138) between the API connector instance 116 and the cloud service broker interface 126. In some embodiments, the message indicating the API connector instance 116 has been deployed may be placed in a message queue from which the notifications are either pushed by the connector hub 106 or pulled by the cloud service broker interface 126.

In some embodiments, a monitoring agent (e.g., the monitoring agent 128 of FIG. 1) may have been previously deployed on a cloud service broker (e.g., the cloud service broker interface 126) that is usable to receive/retrieve the indication. In such embodiments, upon detection of the indication, the monitoring agent 128 may initiate the establishment of the communication channel 138 between the cloud service broker interface 126 and the API connector instance 116 using the broker provisioning channel credentials (see, e.g., the method 700 of FIG. 7). Accordingly, the indication includes an address of the API connector instance 116 (e.g., in a URI) deployed in block 608 that usable by the monitoring agent 128 to establish the communication channel 138 and complete the provisioning channel 140. It should be appreciated that, in alternative embodiments that do not include the monitoring agent 128, the configuration of the communication channel 138 may be performed manually at the cloud service broker interface 126.

Figure 7:
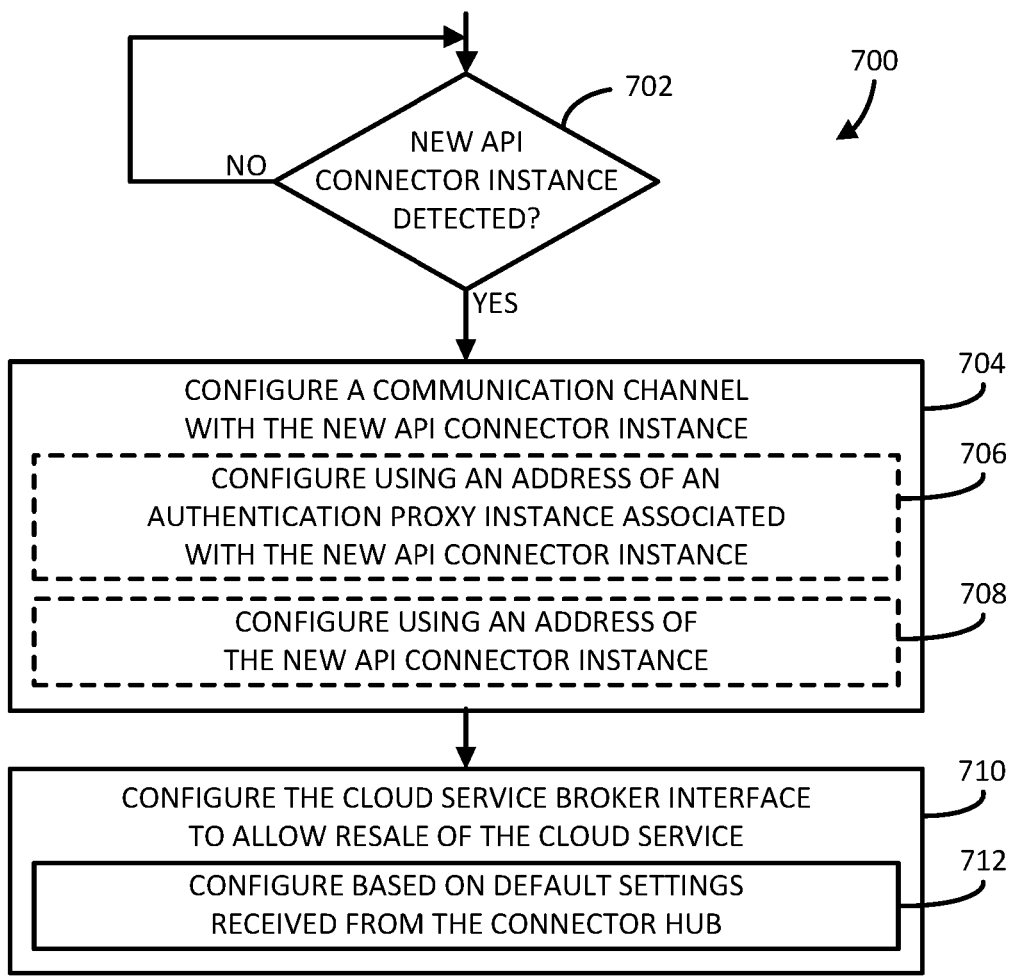
FIG. 7 is a schematic flow diagram of an illustrative method for configuring a cloud service broker of FIG. 1 for reselling a new service that may be performed by a monitoring agent of the broker computing device of FIG. 1.

Referring now to FIG. 7, an illustrative method 700 is provided for configuring a cloud service for resale by a cloud service broker that may be performed by a cloud service broker interface of a broker computing device (e.g., the cloud service broker interface 126 of the broker computing device 124 of FIG. 1), or more particularly by a monitoring agent (e.g., the monitoring agent 128 of FIG. 1) of the cloud service broker interface 126. The method 600 begins in block 702, in which the monitoring agent 128 determines whether a new API connector instance (e.g., the API connector instance 116) has been detected.

Under certain conditions, source code of an API connector (i.e., used to deploy an API connector instance 116) may be changed by the cloud service provider. Under such conditions, the connector hub 106 is configured to deploy new instances of the API connector. Accordingly, as a result of the trusted relationship between the new instance of the authentication proxy instance 114 and the cloud service broker interface 126, the communication channel 136 may be re-stablished without additional configuration. It should be appreciated that the monitoring channel 142 may be established between the monitoring agent 128 and the connector hub 106 to transmit messages therebetween. Such messages include messages that indicate the health (e.g., quality of service) of the communication channel 136, as well as message which indicate that a new API connector instance 116 is available, thereby triggering the method 700.

It should be further appreciated that, under certain conditions, a new authentication proxy instance 114 may be deployed and/or the broker provisioning channel credentials changed. Under such conditions, connector hub 106 is configured notify the cloud service broker interface 126 of the new authentication proxy instance 114 and/or the new broker provisioning channel credentials. Accordingly, one of the methods 500, 600, depending on whether the embodiment includes an authentication proxy instance 114, may be used to re-establish the communication channel 138. In some embodiments, such notification may be performed via a monitoring channel (see, e.g., the monitoring channel 142 of FIG. 1) between the monitoring agent 128 and the connector hub 106.

If the monitoring agent 128 determines that a new API connector instance 116 has been detected, the method 700 advances to block 704. In block 704, the monitoring agent 128 configures a communication channel (e.g., the communication channel 138 of the provisioning channel 140) with the new API connector instance 116 that was detected in block 702. To do so, in some embodiments, in block 706, the monitoring agent 128 configures the communication channel 138 based on a URI of an authentication proxy instance (e.g., the authentication proxy instance 114 of FIG. 1) that is associated with the new API connector instance 116. Otherwise, in alternative embodiments (i.e., embodiments in which the authentication proxy instance 114 is not deployed), in block 708, the monitoring agent 128 configures the communication channel 138 based on a URI that includes information usable to establish the communication channel with the new API connector instance 116.

In block 710, the monitoring agent 128 configures the cloud service broker interface 126 to allow resale of the cloud service associated with the new API connector instance 114. To do so, in block 712, the monitoring agent 128 configures the cloud service broker interface 126 based on default settings received from the connector hub 106 (e.g., via the monitoring channel 142). The default settings may include sales plans, service templates, pricing models, descriptions, etc. It should be appreciated that the settings may be changed by the cloud service broker (e.g., via the cloud service broker interface 126) upon completion of the initial configuration performed in block 710.

It should be appreciated that, under certain conditions, the monitoring agent 128 may have not been deployed prior to the method 700 being performed. In such embodiments, the cloud service broker marketplace 104 may be configured to provide an indication to the cloud service interface broker 126 to deploy the monitoring agent 128. Such an indication may include information usable to initially configure the monitoring agent 128, as well as information usable by the monitoring agent 128 to monitor the health of communication channel 138. Upon successful deployment and successful configuration of the cloud service for resale, the monitoring agent 128 may then monitor the health of communication channel 138 and report to the connector hub 106 results of the monitoring operation.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for securely extending cloud service application programming interfaces (APIs) in a cloud service marketplace, the method comprising:
    receiving, by a connector hub, an API connector provision notification from the cloud service marketplace, the API connector provision notification comprising an identifier of a cloud service broker;
    generating, by the connector hub, broker provisioning channel credentials corresponding to the cloud service broker associated with the API connector provision notification and based on the identifier of the cloud service broker;
    deploying, by a connector hub of a marketplace computing device, an API connector instance in a connection factory of the marketplace computing device, wherein the API connector instance comprises source code of an API connector usable to communicate with a remote API associated with a cloud service of a cloud service provider;
    transmitting, by the connector hub, provider provisioning channel credentials to the API connector instance and a cloud service provider interface of the cloud service provider;
    transmitting, by the connector hub, the broker provisioning channel credentials to the API connector instance and a cloud service broker interface of the cloud service broker; and
    the establishing of, by the connector hub, a provisioning channel between the cloud service provider interface and the cloud service broker interface, wherein establishing the provisioning channel comprises establishing (i) a first communication channel between the API connector instance and the cloud service provider interface using the provider provisioning channel credentials to perform a first authentication operation, and (ii) a second communication channel between the API connector instance and the cloud service broker interface using the broker provisioning channel credentials to perform a second authentication operation.

2. The method of claim 1, further comprising:
    generating, by the connector hub, proxy provisioning channel credentials; deploying, by the connector hub, an authentication proxy instance in the connection factory; and
    transmitting, by the connector hub, the proxy provisioning channel credentials to the API connector instance and the authentication proxy instance,
    wherein the establishing of the provisioning channel between the cloud service provider interface and the cloud service broker interface comprises establishing (i) a first communication channel between the API connector instance and the cloud service provider interface by using the provider provisioning channel credentials to perform a first authentication operation, (ii) a second communication channel between the authentication proxy instance and the cloud service broker interface by using the broker provisioning channel credentials to perform a second authentication operation, and (iii) a third communication channel between the API connector instance and the authentication proxy instance by using the proxy provisioning channel credentials to perform a third authentication operation.

3. The method of claim 2, wherein the establishing of the second communication channel between the authentication proxy instance and the cloud service broker interface includes transmitting an address of the authentication proxy instance to the cloud service broker interface,
    wherein the address is usable by the cloud service broker interface to initiate communications with the authentication proxy instance.

4. The method of claim 1, wherein the generating of the broker provisioning channel credentials for the cloud service broker comprises generating the broker provisioning channel credentials in response to having received the API connector provision notification.

5. The method of claim 1, further comprising:
    receiving, by the connector hub, an indication from the cloud service provider that a new cloud service of the cloud service provider has been made available in a cloud service broker marketplace; and
    generating, by the connector hub, the provider provisioning channel credentials corresponding to the cloud service provider in response to having received the indication.

6. The method of claim 5, further comprising:
    storing, by the connector hub, the provider provisioning channel credentials in a credentials database of the connector hub;
    associating, by the connector hub, the provider provisioning channel credentials with the cloud service provider in the credentials database;
    storing, by the connector hub, the broker provisioning channel credentials in the credentials database; and
    associating, by the connector hub, the broker provisioning channel credentials with the cloud service broker.

7. The method of claim 2, wherein the establishing of the second communication channel between the API connector instance and the cloud service broker interface includes transmitting an address of the API connector instance to the cloud service broker interface, wherein the address is usable by the cloud service broker interface to initiate communications with the authentication proxy instance.

8. One or more non-transitory computer-readable storage media comprising a plurality of instructions stored thereon that in response to being executed cause a connector hub of a marketplace computing device to:
    receive an API connector provision notification from the cloud service marketplace, the API connector provision notification comprising an identifier of a cloud service broker;
    generate broker provisioning channel credentials corresponding to the cloud service broker associated with the API connector provision notification and based on the identifier of the cloud service broker;

deploy an Application Programming Interface (API) connector instance in a connection factory of the marketplace computing device, wherein the API connector instance comprises source code of an API connector usable to communicate with a remote API associated with a cloud service of the cloud service provider;

transmit provider provisioning channel credentials to the API connector instance and a cloud service provider interface of the cloud service provider;

transmit the broker provisioning channel credentials to the API connector instance and a cloud service broker interface of the cloud service broker; and establish a provisioning channel between the cloud service provider interface and the cloud service broker interface, wherein to establish the provisioning channel comprises to establish (i) a first communication channel between the API connector instance and the cloud service provider interface using the provider provisioning channel credentials to perform a first authentication operation, and (ii) a second communication channel between the API connector instance and the cloud service broker interface using the broker provisioning channel credentials to perform a second authentication operation.

9. The one or more non-transitory computer-readable storage media of claim 8, wherein the plurality of instructions further cause the connector hub to:

generate proxy provisioning channel credentials;

deploy an authentication proxy instance in the connection factory; and transmit the proxy provisioning channel credentials to the API connector instance and the authentication proxy instance, wherein to establish the provisioning channel between the cloud service provider interface and the cloud service broker interface comprises to establish (i) a first communication channel between the API connector instance and the cloud service provider interface by using the provider provisioning channel credentials to perform a first authentication operation, (ii) a second communication channel between the authentication proxy instance and the cloud service broker interface by using the broker provisioning channel credentials to perform a second authentication operation, and (iii) a third communication channel between the API connector instance and the authentication proxy instance by using the proxy provisioning channel credentials to perform a third authentication operation.

10. The one or more non-transitory computer-readable storage media of claim 9, wherein to establish the second communication channel between the authentication proxy instance and the cloud service broker interface includes to transmit an address of the authentication proxy instance to the cloud service broker interface, wherein the address is usable by the cloud service broker interface to initiate communications with the authentication proxy instance.

11. The one or more non-transitory computer-readable storage media of claim 8, wherein the plurality of instructions further cause the connector hub generate the broker provisioning channel credentials in response to having received the API connector provision notification.

12. The one or more non-transitory computer-readable storage media of claim 8, wherein the plurality of instructions further cause the connector hub to:

receive an indication from the cloud service provider that a new cloud service of the cloud service provider has been made available in a cloud service broker marketplace; and generate the provider provisioning channel credentials in response to having received the indication.

13. The one or more non-transitory computer-readable storage media of claim 12, wherein the plurality of instructions further cause the connector hub to:

store the provider provisioning channel credentials in a credentials database of the connector hub;

associate the provider provisioning channel credentials with the cloud service provider in the credentials database;

store the broker provisioning channel credentials in the credentials database; and associate the broker provisioning channel credentials with the cloud service broker.

14. The one or more non-transitory computer-readable storage media of claim 9, wherein to establish the second communication channel between the API connector instance and the cloud service broker interface includes to transmit an address of the API connector instance to the cloud service broker interface, wherein the address is usable by the cloud service broker interface to initiate communications with the authentication proxy instance.

15. A marketplace computing device for securely extending cloud service application programming interfaces (APIs) in a cloud service marketplace, wherein the cloud service marketplace includes a marketplace computing device, the marketplace computing device comprising:

a CPU having one or more processors; and a memory having stored therein a plurality of instructions that when executed by the one or more processors of the CPU cause a connector hub of the marketplace computing device to:

receive an API connector provision notification from the cloud service marketplace, the API connector provision notification comprising an identifier of a cloud service broker;

generate broker provisioning channel credentials corresponding to the cloud service broker associated with the API connector provision notification and based on the identifier of the cloud service broker;

deploy an API connector instance in a connection factory of the marketplace computing device, wherein the API connector instance comprises source code of an API connector usable to communicate with a remote API associated with a cloud service of a cloud service provider;

transmit provider provisioning channel credentials to the API connector instance and a cloud service provider interface of the cloud service provider;

transmit the broker provisioning channel credentials to the API connector instance and a cloud service broker interface of the cloud service broker; and establish a provisioning channel between the cloud service provider interface and the cloud service broker interface, wherein to establish the provisioning channel comprises to establish (i) a first communication channel between the API connector instance and the cloud service provider interface using the provider provisioning channel credentials to perform a first authentication operation, and (ii) a second communication channel between the API connector instance and the cloud service broker interface using the broker provisioning channel credentials to perform a second authentication operation.

16. The marketplace computing device of claim 15, wherein the one or more processors are further configured to execute the instructions to:

generate proxy provisioning channel credentials;

deploy an authentication proxy instance in the connection factory; and transmit the proxy provisioning channel credentials to the API connector instance and the authentication proxy instance, wherein to establish the provisioning channel between the cloud service provider interface and the cloud service broker interface comprises to establish (i) a first communication channel between the API connector instance and the cloud service provider interface by using the provider provisioning channel credentials to perform a first authentication operation, (ii) a second communication channel between the authentication proxy instance and the cloud service broker interface by using the broker provisioning channel credentials to perform a second authentication operation, and (iii) a third communication channel between the API connector instance and the authentication proxy instance by using the proxy provisioning channel credentials to perform a third authentication operation.

17. The marketplace computing device of claim 16, wherein to establish the second communication channel between the authentication proxy instance and the cloud service broker interface includes to transmit an address of the authentication proxy instance to the cloud service broker interface, wherein the address is usable by the cloud service broker interface to initiate communications with the authentication proxy instance.

18. The marketplace computing device of claim 15, wherein the one or more processors are further configured to execute the instructions to:

receive an indication from the cloud service provider that a new cloud service of the cloud service provider has been made available in a cloud service broker marketplace; and generate the provider provisioning channel credentials in response to having received the indication.

19. The marketplace computing device of claim 18, wherein the one or more processors are further configured to execute the instructions to:

store the provider provisioning channel credentials in a credentials database of the connector hub;

associate the provider provisioning channel credentials with the cloud service provider in the credentials database;

store the broker provisioning channel credentials in the credentials database; and associate the broker provisioning channel credentials with the cloud service broker.

20. The marketplace computing device of claim 16, wherein to establish the second communication channel between the API connector instance and the cloud service broker interface includes to transmit an address of the API connector instance to the cloud service broker interface, wherein the address is usable by the cloud service broker interface to initiate communications with the authentication proxy instance.

* * * * *